US007681299B2

(12) United States Patent
Reid

(10) Patent No.: US 7,681,299 B2
(45) Date of Patent: Mar. 23, 2010

(54) VACUUM INSULATED STRUCTURES

(75) Inventor: Aarne H. Reid, Jupiter, FL (US)

(73) Assignee: Concept Group Inc., West Berlin, NJ (US)

(*) Notice: Subject to any disclaimer, the term of this patent is extended or adjusted under 35 U.S.C. 154(b) by 211 days.

(21) Appl. No.: 11/903,858

(22) Filed: Sep. 25, 2007

(65) Prior Publication Data

US 2008/0121642 A1 May 29, 2008

Related U.S. Application Data

(62) Division of application No. 10/808,171, filed on Mar. 23, 2004, now Pat. No. 7,374,063.

(51) Int. Cl.
*B21B 1/46* (2006.01)
*B21B 13/22* (2006.01)
*B22D 11/126* (2006.01)
*B22D 11/128* (2006.01)
*B23P 17/00* (2006.01)

(52) U.S. Cl. .................... 29/530; 29/527.1; 29/525.14; 220/592.27; 220/62.18

(58) Field of Classification Search ................ 29/527.1, 29/530, 525.14; 220/592.27, 62.18, 4.21
See application file for complete search history.

(56) References Cited

U.S. PATENT DOCUMENTS 2,666,979 A 1/1954 Van Dusen .................. 29/428
4,653,469 A * 3/1987 Miyaji et al. ............. 126/390.1
4,997,124 A * 3/1991 Kitabatake et al. .......... 228/184
5,573,140 A * 11/1996 Satomi et al. .......... 220/592.27

* cited by examiner

*Primary Examiner*—Jermie E Cozart
*Assistant Examiner*—Christopher M Koehler
(74) *Attorney, Agent, or Firm*—Drinker Biddle & Reath LLP

(57) ABSTRACT

An article includes walls defining an insulating space therebetween and a vent forming an exit for gas molecules during evacuation of the space. A distance separating the walls is variable in a portion adjacent the vent such that gas molecules are directed towards the vent imparting a greater probability of molecule egress than ingress such that deeper vacuum is developed without requiring getter material. The variable-distance portion may be formed by converging walls. Alternatively, a portion of one of the walls may be formed such that a normal line at any location within that portion is directed substantially towards a vent opening in the other wall.

7 Claims, 9 Drawing Sheets

VACUUM INSULATED STRUCTURES

CROSS-REFERENCE TO RELATED APPLICATION

This application is a divisional application of U.S. patent application Ser. No. 10/808,171, filed Mar. 23, 2004 now U.S. Pat. No. 7,374,063, which is hereby incorporated by reference in its entirety.

FIELD OF THE INVENTION

The invention relates to structures having an insulating space that is evacuated by an applied vacuum and sealed.

BACKGROUND OF THE INVENTION

It is well known that vacuum provides an excellent thermal insulator. Vacuum-sealed spaces have been incorporated in a wide variety of structures including cryogenic devices such as medical probes, and high temperature devices, such as heat exchangers. It is also known to include gas-absorbing material, most commonly a "non-evaporable getter" material, within the vacuum-sealed space in order to achieve a sealed vacuum deeper than the vacuum of the chamber in which the insulating space is evacuated. The getter material, which may comprise metals such as zirconium, titanium, niobium, tantalum, and vanadium, as well as alloys of those metals, may be loosely contained within the vacuum space or, alternatively, coated on the inside of one or more of the surfaces defining the vacuum space.

The presence of the getter material in the vacuum space, whether loosely contained or as a coating, will limit the minimum possible width of the vacuum space. In applications where the width of the vacuum space is small, such as that encountered in many medical devices, space constraints prohibit the use of getter material in the vacuum space. The ability to form a deep vacuum in such applications without the need for getter material is therefore highly desirable.

SUMMARY OF THE INVENTION

According to the invention, an article comprises first and second walls spaced at a distance to define an insulating space therebetween and a vent communicating with the insulating space to provide an exit pathway for gas molecules from the insulating space. The vent is sealable for maintaining a vacuum within the insulating space following evacuation of gas molecules through the vent. The distance between the first and second walls is variable in a portion of the insulating space adjacent the vent such that gas molecules within the insulating space are directed towards the vent during evacuation of the insulating space. The direction of the gas molecules towards the vent imparts to the gas molecules a greater probability of egress than ingress with respect to the insulating space, thereby providing a deeper vacuum without requiring a getter material in the insulating space.

According to one embodiment, one of the walls of the article includes a portion that converges toward the other wall adjacent the vent such that the distance between the walls is minimum adjacent the location at which the vent communicates with the insulating space. The first and second walls may be provided by first and second tubes arranged substantially concentrically to define an annular space therebetween. Alternatively, one of the walls may define a substantially rectangular insulating space for a container.

According to another embodiment, the vent is defined by an opening in one of the walls of the article and the other wall includes a portion opposite the vent that is arranged such that a normal line at any location within that portion is directed substantially towards the vent. The article may be a Dewar including an upper substantially cylindrical portion and a lower substantially spherical portion. The opening provided in an outer wall in the lower portion and an inner wall including an indented portion opposite the vent.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE DRAWINGS

The present invention increases the depth of vacuum that can be sealed within an insulation space by providing a geometry adjacent an exit having a guiding effect on gas molecules during an evacuation process. As will be described in greater detail, the geometry according to the invention provides for removal of a greater number of gas molecules from the space than could otherwise be achieved without the use of a getter material. The elimination of the need for a getter material in the evacuated space to achieve deep vacuums is a significant benefit of the present invention. By eliminating the need for getter material, the invention provides for deepened vacuums in insulated spaces in which this was not previously possible because of space constraints. Such insulated spaces include those for devices of miniature scale or devices having insulating spaces of extremely narrow width.

Figure 1:
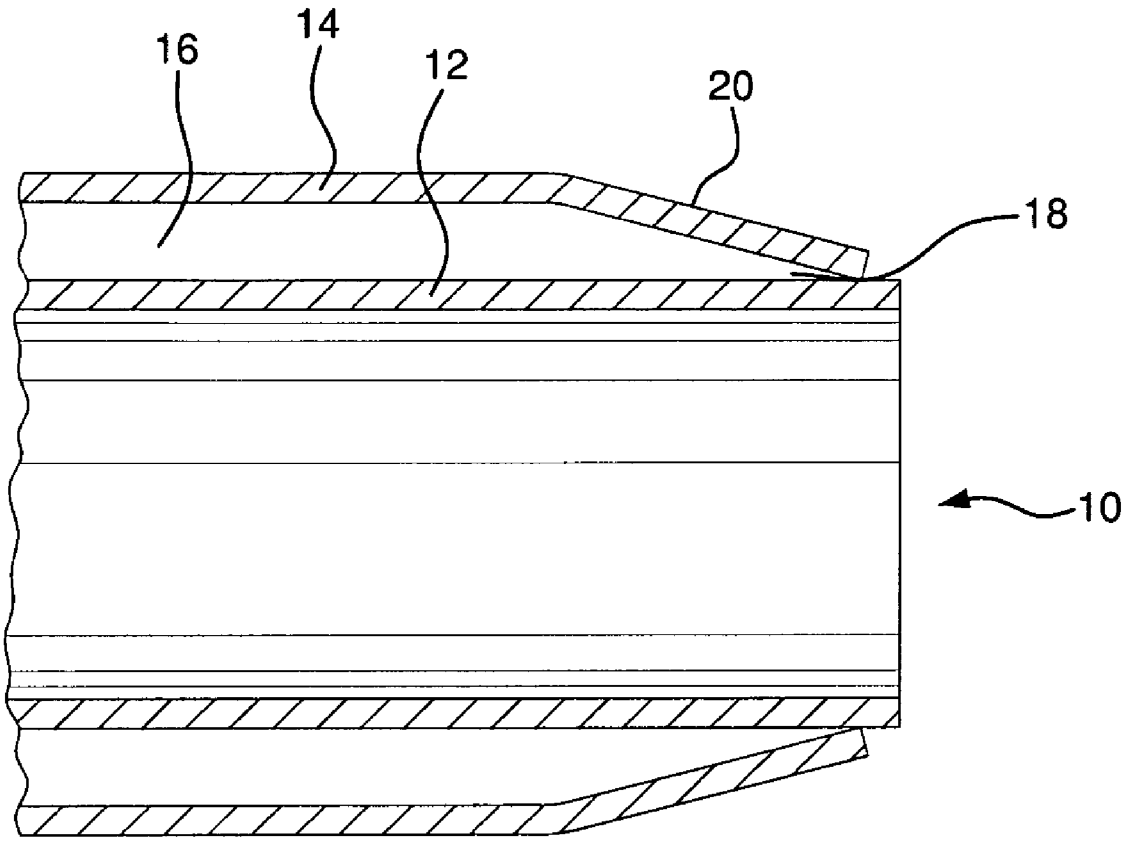
FIG. 1 is a partial sectional view of a structure incorporating an insulating space according to the invention.

Referring to the drawings, where like numerals identify like elements, there is shown in FIG. 1 an end portion of a structure 10 according to the invention having gas molecule guiding geometry. Structure 10 appears in FIG. 1 at a scale that was chosen for clearly showing the gas molecule guiding geometry of the invention. The invention, however, is not limited to the scale shown and has application to devices of any scale from miniaturized devices to devices having insulating spaces of very large dimensions. Structure 10 includes inner and outer tubes 12, 14, respectively, sized and arranged to define an annular space 16 therebetween. The tubes 12, 14 engage each other at one end to form a vent 18 communicating with the vacuum space 16 and with an exterior. The vent 18 provides an evacuation path for egress of gas molecules from space 16 when a vacuum is applied to the exterior, such as when structure 10 is placed in a vacuum chamber, for example.

The vent 18 is sealable in order to maintain a vacuum within the insulating space following removal of gas molecules in a vacuum-sealing process. In its presently preferred form, the space 16 of structure 10 is sealed by brazing tubes 12, 14 together. The use of brazing to seal the evacuation vent of a vacuum-sealed structure is generally known in the art. To seal the vent 18, a brazing material (not shown) is positioned between the tubes 12, 14 adjacent their ends in such a manner that, prior to the brazing process, the evacuation path defined by the vent 18 is not blocked by the material. During the evacuation process, however, sufficient heat is applied to the structure 10 to melt the brazing material such that it flows by capillary action into the evacuation path defined by vent 18. The flowing brazing material seals the vent 18 and blocks the evacuation path. A brazing process for sealing the vent 18, however, is not a requirement of the invention. Alternative methods of sealing the vent 18 could be used, such as a metallurgical or chemical processes.

The geometry of the structure 10 effects gas molecule motion in the insulating space 16 in the following manner. A major assumption of Maxwell's gas law regarding molecular kinetic behavior is that, at higher concentrations of gas molecules, the number of interactions occurring between gas molecules will be large in comparison to the number of interactions that the gas molecules have with a container for the gas molecules. Under these conditions, the motion of the gas molecules is random and, therefore, is not affected by the particular shape of the container. When the concentration of the gas molecules becomes low, however, as occurs during evacuation of an insulating space for example, molecule-to-molecule interactions no longer dominate and the above assumption of random molecule motion is no longer valid. As relevant to the invention, the geometry of the vacuum space becomes a first order system effect rather than a second order system effect when gas molecule concentration is reduced during evacuation because of the relative increase in gas molecule-to-container interactions.

The geometry of the insulating space 16 guides gas molecules within the space 16 toward the vent 18. As shown in FIG. 1, the width of the annular space 16 is not uniform throughout the length of structure 10. Instead, the outer tube 14 includes an angled portion 20 such that the outer tube converges toward the inner tube 12 adjacent an end of the tubes. As a result the radial distance separating the tubes 12, 14 varies adjacent the vent 18 such that it is at a minimum adjacent the location at which the vent 18 communicates with the space 16. As will be described in greater detail, the interaction between the gas molecules and the variable-distance portion of the tubes 12, 14 during conditions of low molecule concentration serves to direct the gas molecules toward the vent 18.

The molecule guiding geometry of space 16 provides for a deeper vacuum to be sealed within the space 16 than that which is imposed on the exterior of the structure 10 to evacuate the space. This somewhat counterintuitive result of deeper vacuum within the space 16 is achieved because the geometry of the present invention significantly increases the probability that a gas molecule will leave the space rather than enter. In effect, the geometry of the insulating space 16 functions like a check valve to facilitate free passage of gas molecules in one direction (via the exit pathway defined by vent 18) while blocking passage in the opposite direction.

An important benefit associated with the deeper vacuums provided by the geometry of insulating space 16 is that it is achievable without the need for a getter material within the evacuated space 16. The ability to develop such deep vacuums without a getter material provides for deeper vacuums in devices of miniature scale and devices having insulating spaces of narrow width where space constraints would limit the use of a getter material.

Although not required, a getter material could be used in an evacuated space having gas molecule guiding structure according to the invention. Other vacuum enhancing features could also be included, such as low-emissivity coatings on the surfaces that define the vacuum space. The reflective surfaces of such coatings, generally known in the art, tend to reflect heat-transferring rays of radiant energy. Limiting passage of the radiant energy through the coated surface enhances the insulating effect of the vacuum space.

The construction of structures having gas molecule guiding geometry according to the present invention is not limited to any particular category of materials. Suitable materials for forming structures incorporating insulating spaces according to the present invention include, for example, metals, ceramics, metalloids, or combinations thereof.

Referring again to the structure 10 shown in FIG. 1, the convergence of the outer tube 14 toward the inner tube 12 in the variable distance portion of the space 16 provides guidance of molecules in the following manner. When the gas molecule concentration becomes sufficiently low during evacuation of space 16 such that structure geometry becomes a first order effect, the converging walls of the variable distance portion of space 16 will channel gas molecules in the space 16 toward the vent 18. The geometry of the converging wall portion of the vacuum space 16 functions like a check valve or diode because the probability that a gas molecule will leave the space 16, rather than enter, is greatly increased.

The effect that the molecule guiding geometry of structure 10 has on the relative probabilities of molecule egress versus entry may be understood by analogizing the converging-wall portion of the vacuum space 16 to a funnel that is confronting a flow of particles. Depending on the orientation of the funnel with respect to the particle flow, the number of particles passing through the funnel would vary greatly. It is clear that a greater number of particles will pass through the funnel when the funnel is oriented such that the particle flow first contacts the converging surfaces of the funnel inlet rather than the funnel outlet.

Various examples of devices incorporating a converging wall exit geometry for an insulating space to guide gas particles from the space like a funnel are shown in FIGS. 2-7. However, it should be understood that the gas guiding geometry of the invention is not limited to a converging-wall funneling construction and may, instead, utilize other forms of gas molecule guiding geometries. For example, the Dewar shown in FIG. 8 and described in greater detail below, incorporates an alternate form of variable distance space geometry according to the invention.

Insulated Probes

Figure 2:
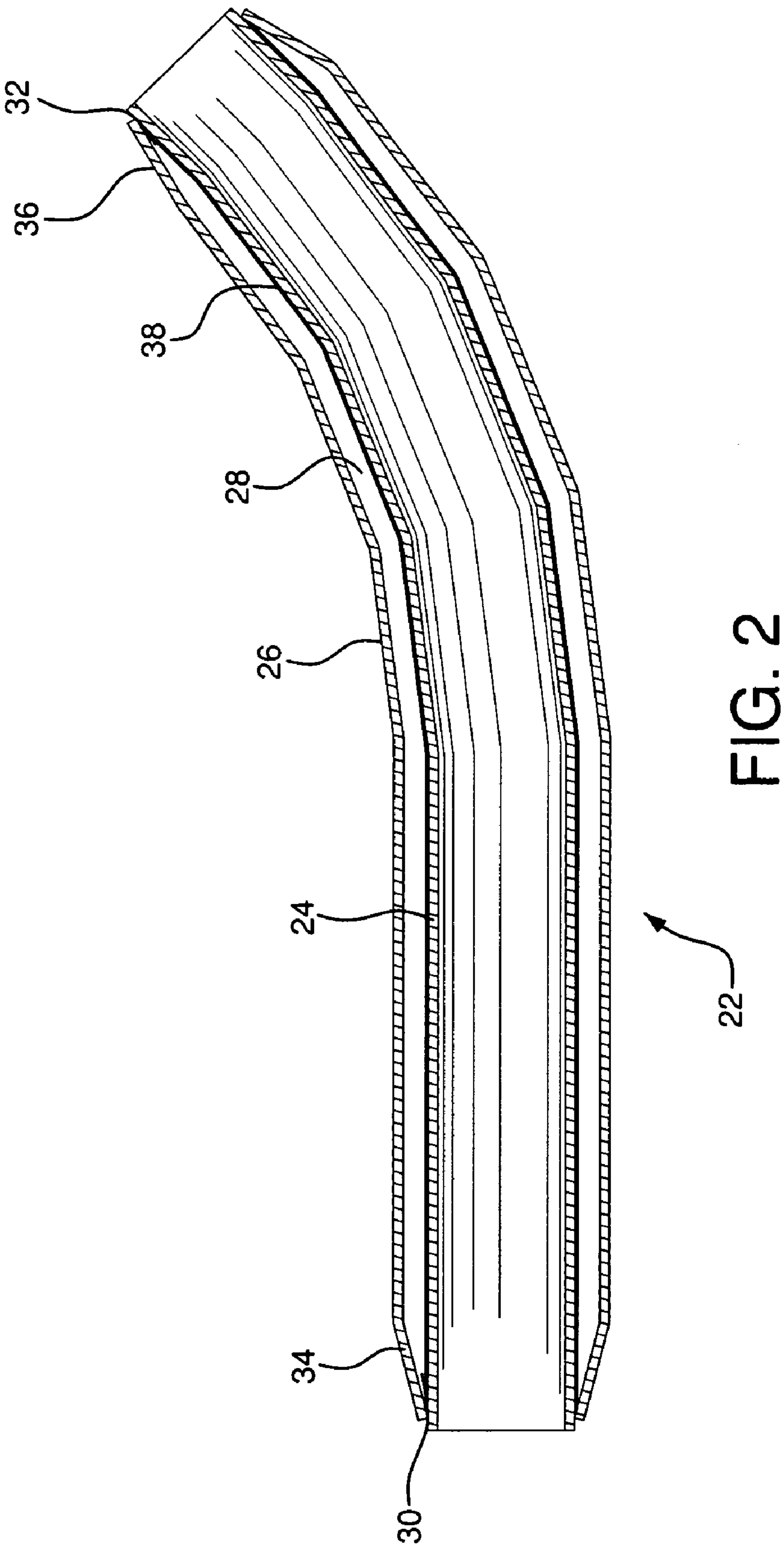
FIG. 2 is a sectional view of another structure according to the invention.

Referring to FIG. 2, there is shown a structure 22 incorporating gas molecule guiding geometry according to the invention. Similar to structure 10, structure 22 includes inner and outer tubes 24, 26 defining an annular vacuum space 28 therebetween. Structure 22 includes vents 30, 32 and angled portions 34, 36 of outer tube 26 at opposite ends that are similar in construction to vent 18 and angled portion 20 of structure 10 of FIG. 1.

The structure 22 may be useful, for example, in an insulated surgical probe. In such an application, it may be desirable that the structure 22 be bent as shown to facilitate access of an end of the probe to a particular target site. Preferably, the concentrically arranged tubes 24, 26 of structure 22 comprise a flexible material and have been bent such that the resulting angle between the central axes of the opposite ends of the structure is approximately 45 degrees.

To enhance the insulating properties of the sealed vacuum layer, an optical coating 38 having low-emissivity properties may be applied to the outer surface of the inner tube 24. The reflective surface of the optical coating limits passage of heat-transferring radiation through the coated surface. The optical coating may comprise copper, a material having a desirably low emissivity when polished. Copper, however, is subject to rapid oxidation, which would detrimentally increase its emissivity. Highly polished copper, for example, can have an emissivity as low as approximately 0.02 while heavily oxidized copper may have an emissivity as high as approximately 0.78.

To facilitate application, cleaning, and protection of the oxidizing coating, the optical coating is preferably applied to the inner tube 24 using a radiatively-coupled vacuum furnace prior to the evacuation and sealing process. When applied in the elevated-temperature, low-pressure environment of such a furnace, any oxide layer that is present will be dissipated, leaving a highly cleaned, low-emissivity surface, which will be protected against subsequent oxidation within the vacuum space 28 when the evacuation path is sealed.

Figure 3:
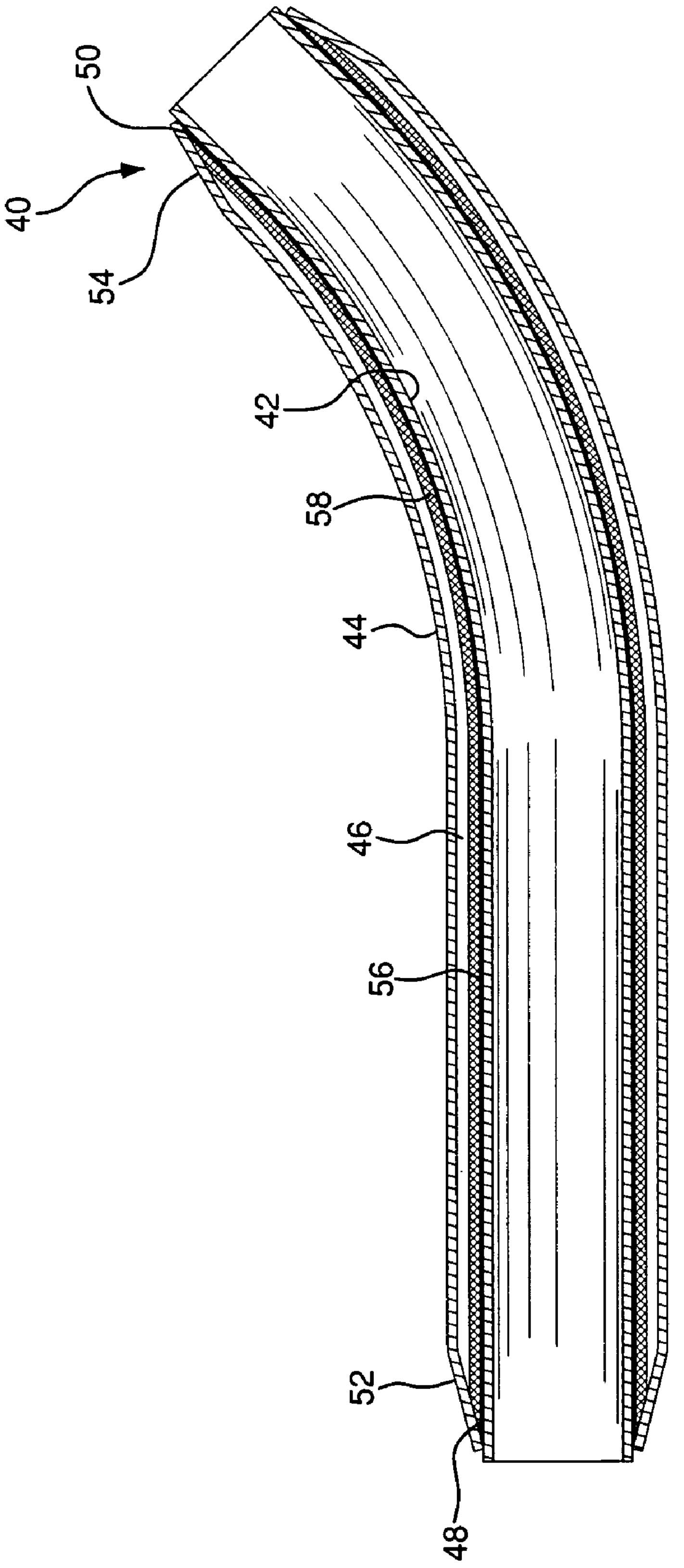
FIG. 3 is a sectional view of an alternative structure to that of FIG. 2 including a layer of spacer material on a surface of the insulation space.

Referring to FIG. 3, there is shown another structure 40 incorporating having gas molecule guiding geometry according to the invention. Similar to structure 10 of FIG. 1, structure 40 includes inner and outer tubes 42, 44 defining an annular vacuum space 46 therebetween. Structure 40 includes vents 48, 50 and angled portions 52, 54 of outer tube 44 at opposite ends similar in construction to vent 18 and angled portion 20 of structure 10 of FIG. 1. Preferably, the concentrically arranged tubes 42, 44 of structure 40 comprise a flexible material and have been bent such that the resulting angle between the central axes of the opposite ends of the structure is approximately 45 degrees. The structure 40, similar to structure 22 of FIG. 2, includes an optical coating 56 applied to the outer surface of inner tube 42.

When concentrically arranged tubes, such as those forming the vacuum spaces of the probes structures 22 and 40 of FIGS. 2 and 3, are subjected to bending loads, contact may occur between the inner and outer tubes while the loading is imposed. The tendency of concentric tubes bent in this fashion to separate from one another, or to "springback," following removal of the bending loads may be sufficient to ensure that the tubes separate from each other. Any contact that does remain, however, could provide a detrimental "thermal shorting" between the inner and outer tubes, thereby defeating the intended insulating function for the vacuum space. To provide for protection against such thermal shorting, structure 40 of FIG. 3 includes a layer 58 of a spacer material, which is preferably formed by winding yarn or braid comprising micro-fibers of ceramic or other low conductivity material. The spacer layer 58 provides a protective barrier that limits direct contact between the tubes without detrimentally limiting the flexibility of the concentrically arranged tubes 42, 44 of structure 40.

Each of the structures of FIG. 1 to 3 could be constructed as a stand-alone structure. Alternatively, the insulating structures of FIGS. 1 to 3 could form an integrated part of another device or system. Also, the insulating structures shown in FIG. 1 to 3 could be sized and arranged to provide insulating tubing having diameters varying from sub-miniature dimensions to very large diameter and having varying length. In addition, as described previously, the gas molecule guiding geometry of the invention allows for the creation of deep vacuum without the need for getter material. Elimination of getter material in the space allows for vacuum insulation spaces having exceptionally small widths.

Joules-Thomson Devices

Figure 4:
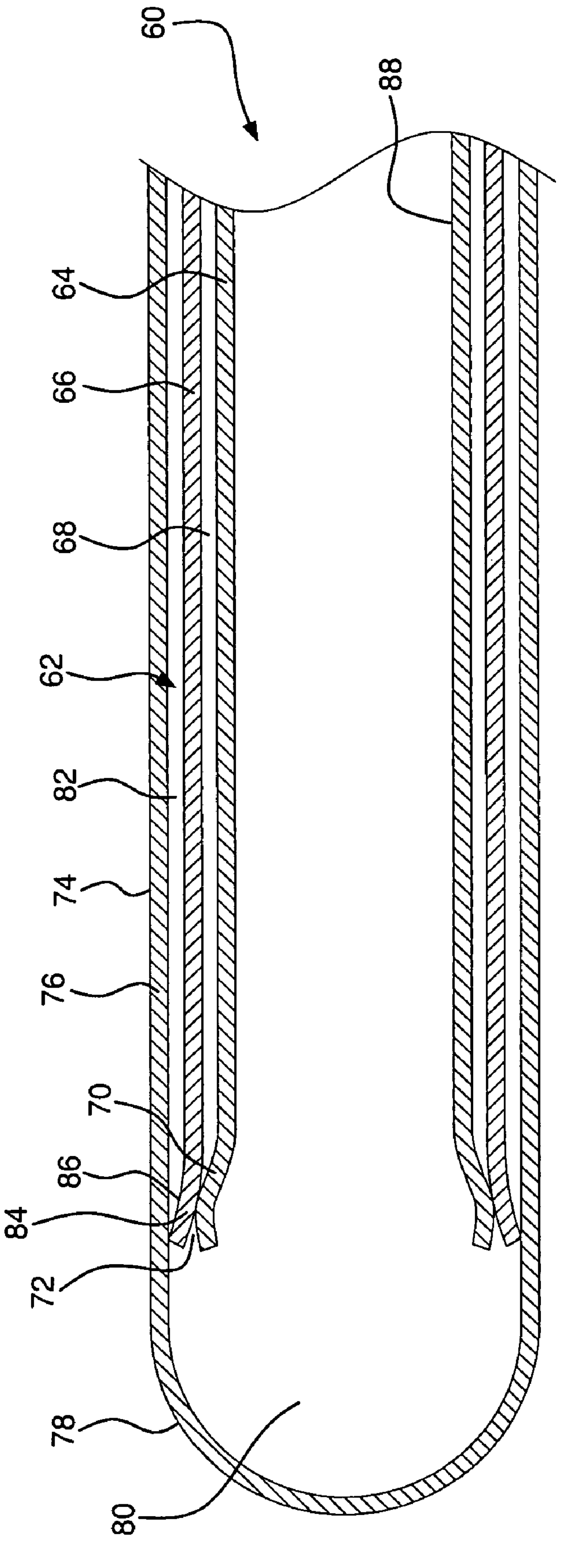
FIG. 4 is a partial sectional view of a cooling device according to the invention.

Referring to FIG. 4, there is shown a cooling device 60 incorporating gas molecule guiding geometry according to the present invention for insulating an outer region of the device 60. The device 60 is cooled utilizing the Joules-Thomson effect in which the temperature of a gas is lowered as it is expanded. First and second concentrically arranged tubes 64 and 66 define an annular gas inlet 68 therebetween. Tube 64 includes an angled portion 70 that converges toward tube 66. The converging-wall portions of the tubes 64, 66 form a flow-controlling restrictor or diffuser 72 adjacent an end of tube 64.

The cooling device 60 includes an outer jacket 74 having a cylindrical portion 76 closed at an end by a substantially hemispherical portion 78. The cylindrical portion 76 of the outer jacket 74 is concentrically arranged with tube 66 to define an annular insulating space 82 therebetween. Tube 66 includes an angled portion 84 that converges toward outer jacket 74 adjacent an evacuation path 86. The variable distance portion of the insulating space 82 differs from those of the structures shown in FIGS. 1-3 because it is the inner element, tube 64, that converges toward the outer element, the cylindrical portion 76. The functioning of the variable distance portion of insulating space 82 to guide gas molecules, however, is identical to that described above for the insulating spaces of the structures of FIGS. 1-3.

The annular inlet 68 directs gas having relatively high pressure and low velocity to the diffuser 72 where it is expanded and cooled in the expansion chamber 80. As a result, the end of the cooling device 60 is chilled. The expanded low-temperature/low-pressure is exhausted through the interior of the inner tube 64. The return of the low-temperature gas via the inner tube 64 in this manner quenches the inlet gas within the gas inlet 68. The vacuum insulating space 82, however, retards heat absorption by the quenched high-pressure side, thereby contributing to overall system efficiency. This reduction in heat absorption may be enhanced by applying a coating of emissive radiation shielding material on the outer surface of tube 66. The invention both enhances heat transfer from the high-pressure/low-velocity region to the low-pressure/low-temperature region and also provides for size reductions not previously possible due to quench area requirements necessary for effectively cooling the high pressure gas flow.

The angled portion 70 of tube 64, which forms the diffuser 72, may be adapted to flex in response to pressure applied by the inlet gas. In this manner, the size of the opening defined by the diffuser 72 between tubes 64 and 66 may be varied in response to variation in the gas pressure within inlet 68. An inner surface 88 of tube 64 provides an exhaust port (not seen) for removal of the relatively low-pressure gas from the expansion chamber 80.

Figure 5:
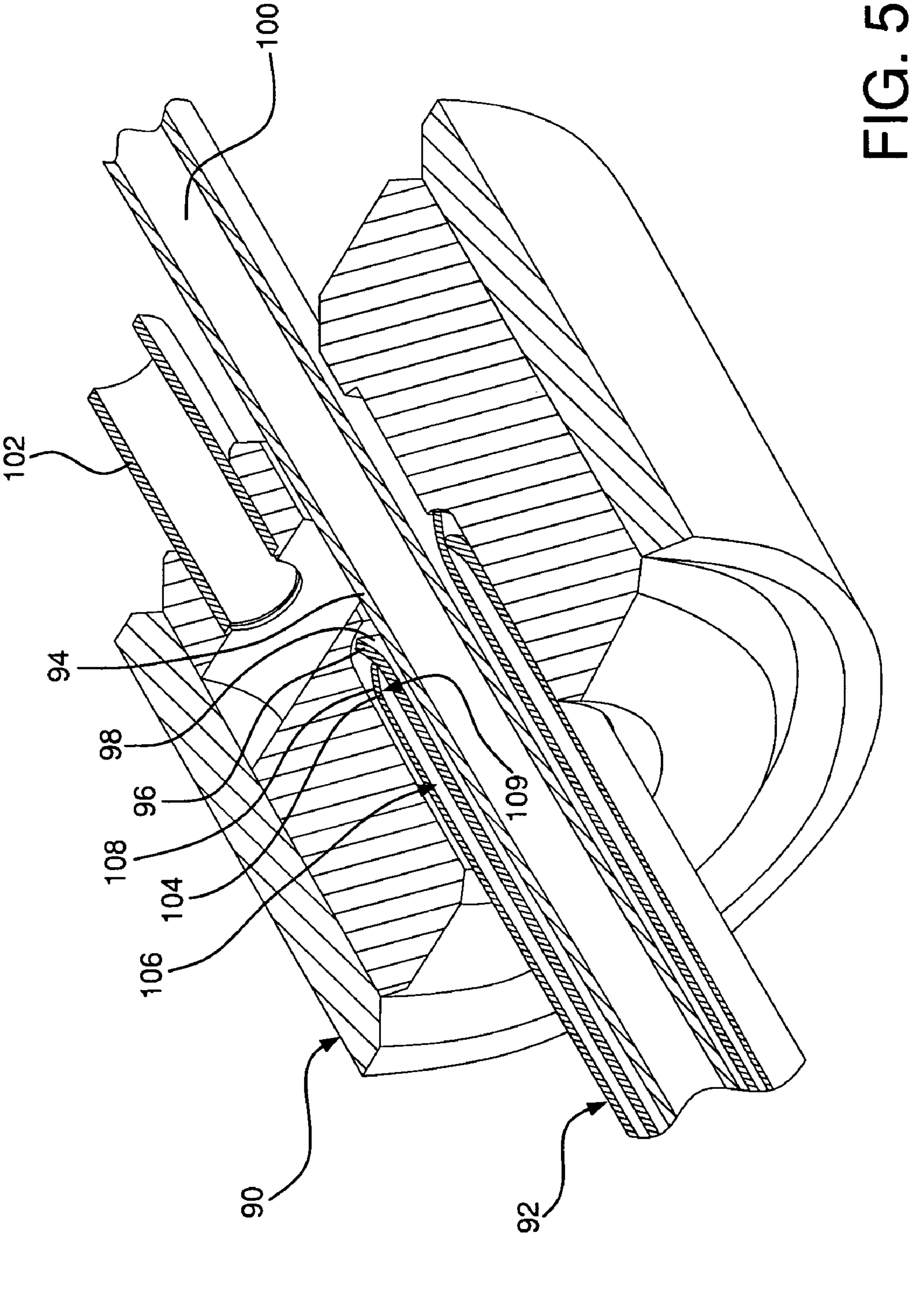
FIG. 5 is a partial perspective view, in section, of an alternative cooling device according to the invention.
Figure 6:
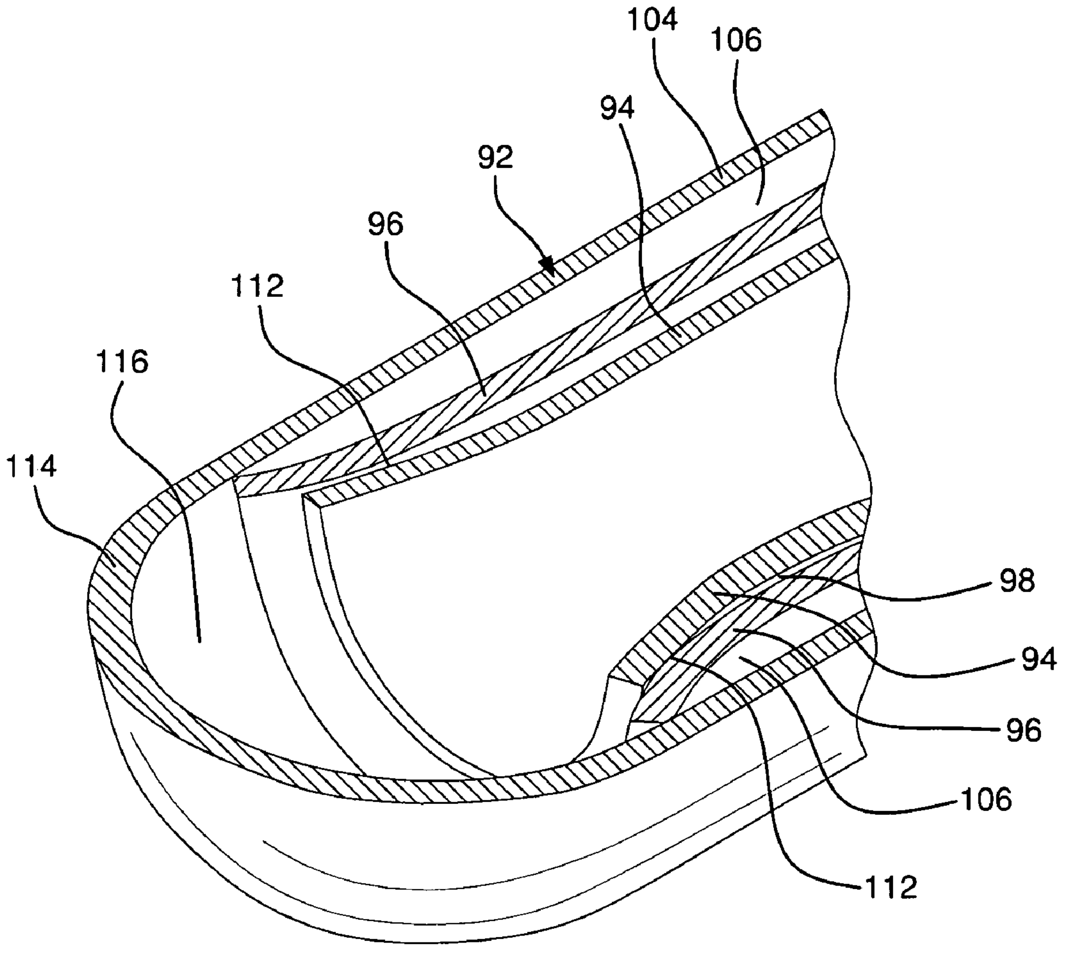
FIG. 6 is a partial perspective view, in section, of an end of the cooling device of FIG. 5 including an expansion chamber.

Referring to FIGS. 5 and 6, there is shown a cryogenic cooler 90 incorporating a Joules-Thomson cooling device 92. The cooling device 92 of the cryogenic cooler 90, similar to the device of FIG. 4, includes tubes 94 and 96 defining a high pressure gas inlet 98 therebetween and a low-pressure exhaust port 100 within the interior of tube 94. The gas supply for cooling device 90 is delivered into cooler 90 via inlet pipe

102. An outer jacket 104 forms an insulating space 106 with tube 96 for insulating an outer portion of the cooling device. The outer jacket 104 includes an angled portion 108 that converges toward the tube 96 adjacent an evacuation path 109. The converging walls adjacent the evacuation path 109 provides for evacuation and sealing of the vacuum space 106 in the manner described previously.

Referring to FIG. 6, the cooling device 92 of the cryogenic cooler 90 includes a flow controlling diffuser 112 defined between tubes 94 and 96. A substantially hemispherical end portion 114 of outer jacket 104 forms an expansion chamber 116 in which expanding gas from the gas inlet 98 chills the end of the device 92.

Figure 7:
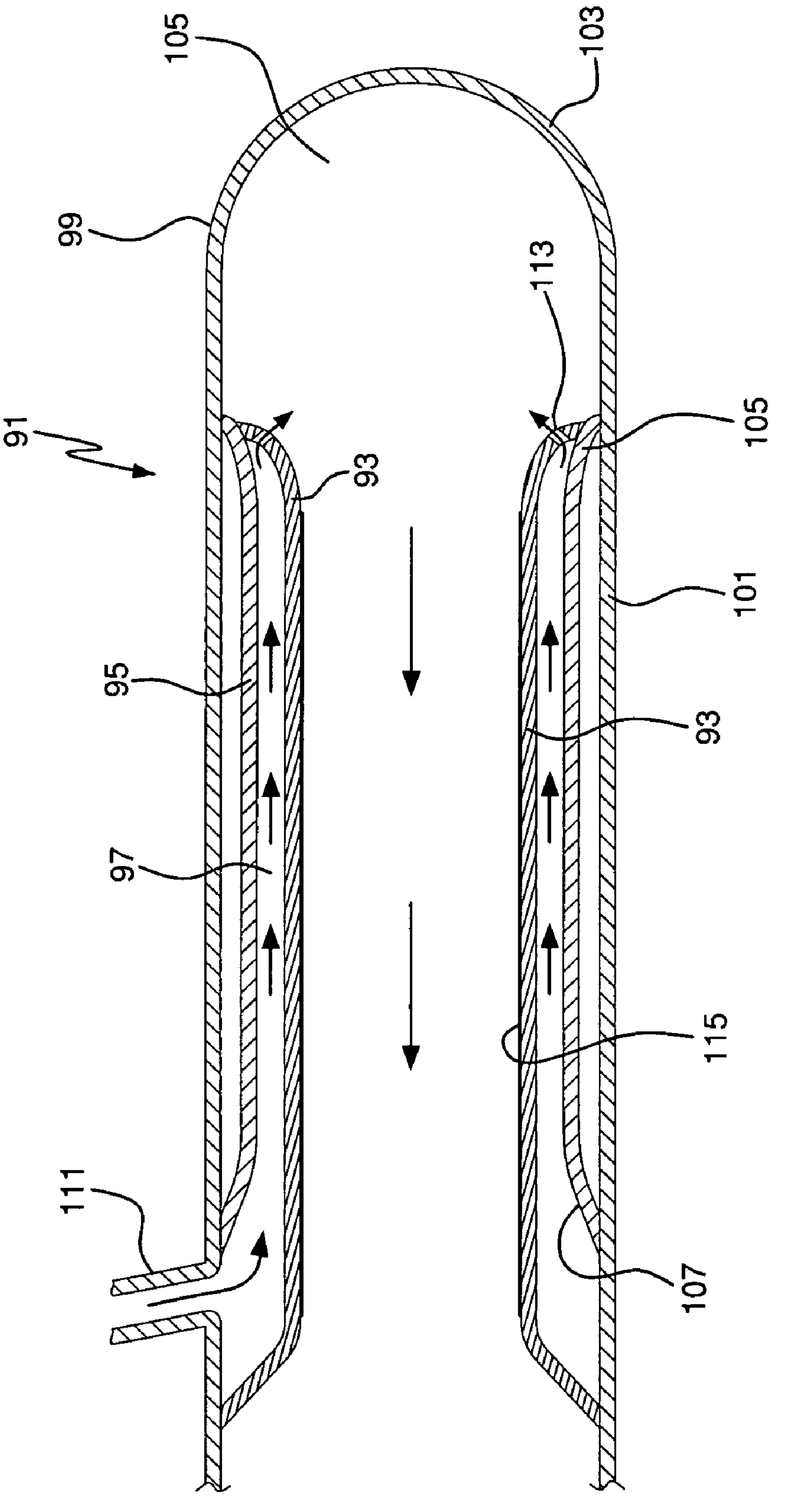
FIG. 7 is a partial sectional view of a cooling device having an alternative gas inlet construction from the cooling devices of FIGS. 4 through 6

Referring to FIG. 7, there is shown a cooling device 91 including concentrically arranged tubes 93, 95 defining an annular gas inlet 97 therebetween. An outer jacket 99 includes a substantially cylindrical portion 101 enclosing tubes 93, 95 and a substantially semi-spherical end portion 103 defining an expansion chamber 105 adjacent an end of the tubes 93, 95. As shown, tube 95 includes angled or curved end portions 105, 107 connected to an inner surface of the outer jacket 99 to form an insulating space 109 between the gas inlet 97 and the outer jacket 99. A supply tube 111 is connected to the outer jacket adjacent end portion 107 of tube 95 for introducing gas into the inlet space 97 from a source of the gas.

The construction of the gas inlet 97 of cooling device 91 adjacent the expansion chamber 105 differs from that of the cooling devices shown in FIGS. 4-6, in which an annular escape path from the gas inlet was provided for delivering gas into the expansion chamber. Instead, tube 93 of cooling device 91 is secured to tube 95 adjacent one end of the tubes 93, 95 to close the end of the gas inlet. Vent holes 113 are provided in the tube 93 adjacent the expansion chamber 105 for injection of gas into the expansion chamber 105 from the gas inlet 97. Preferably, the vent holes 113 are spaced uniformly about the circumference of tube 93. The construction of device 91 simplifies fabrication while providing for a more exact flow of gas from the gas inlet 97 into the expansion chamber 105.

A coating 115 of material having a relatively large thermal conductivity, preferably copper, is formed on at least a portion of the inner surface of tube 93 to facilitate efficient transfer of thermal energy to the tube 93.

Non-Annular Devices

Figure 8:
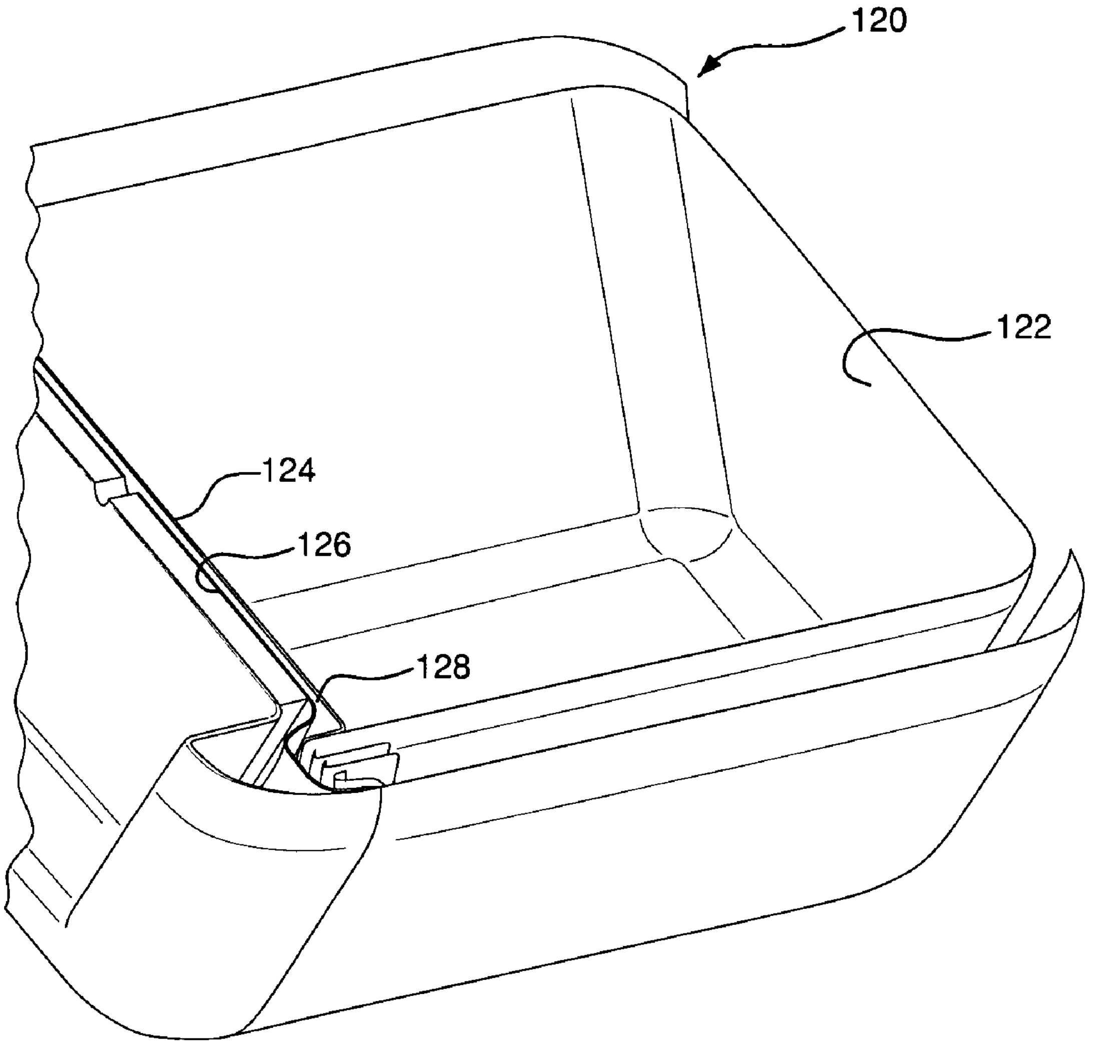
FIG. 8 is a partial perspective view, in section, of a container according to the invention.

Each of the insulating structures of FIGS. 1-7 includes an insulating vacuum space that is annular. An annular vacuum space, however, is not a requirement of the invention, which has potential application in a wide variety of structural configurations. Referring to FIG. 8, for example, there is shown a vacuum insulated storage container 120 having a substantially rectangular inner storage compartment 122. The compartment 122 includes substantially planar walls, such as wall 124 that bounds a volume to be insulated. An insulating space 128 is defined between wall 124 and a second wall 126, which is closely spaced from wall 124. Closely spaced walls (not shown) would be included adjacent the remaining walls defining compartment 122 to provide insulating spaces adjacent the container walls. The insulating spaces could be separately sealed or, alternatively, could be interconnected. In a similar fashion as the insulating structures of FIGS. 1-7, a converging wall portion of the insulating space 128 (if continuous), or converging wall portions of insulating spaces (if separately sealed), are provided to guide gas molecules toward an exit vent. In the insulated storage container 120, however, the converging wall portions of the insulated space 128 is not annular.

The vacuum insulated storage container 120 of FIG. 8 provides a container capable of indefinite regenerative/self-sustaining cooling/heating capacity with only ambient energy and convection as input energy. Thus, no moving parts are required. The storage container 120 may include emissive radiation shielding within the vacuum insulating envelope to enhance the insulating capability of the vacuum structure in the manner described previously.

The storage container 120 may also include an electrical potential storage system (battery/capacitor), and a Proportional Integrating Derivative (PID) temperature control system for driving a thermoelectric (TE) cooler or heater assembly. The TE generator section of the storage container would preferably reside in a shock and impact resistant outer sleeve containing the necessary convection ports and heat/light collecting coatings and or materials to maintain the necessary thermal gradients for the TE System. The TE cooler or heater and its control package would preferably be mounted in a removable subsection of a hinged cover for the storage container 120. An endothermic chemical reaction device (e.g., a "chemical cooker") could also be used with a high degree of success because its reaction rate would relate to temperature, and its effective life would be prolonged because heat flux across the insulation barrier would be exceptionally low.

Commercially available TE generator devices are capable of producing approximately 1 $mW/in^2$ with a device gradient of 20° K and approximately 6 $mW/in^2$ with a device gradient of 40° K. Non-linear efficiency curves are common for these devices. This is highly desirable for high ambient temperature cooling applications for this type of system, but may pose problems for low temperature heating applications.

High end coolers have conversion efficiencies of approximately 60%. For example a 10" diameter container 10" in height having 314 $in^2$ of surface area and a convective gradient of 20° K would have a total dissipation capacity of approximately 30 mW. A system having the same mechanical design with a 40° K convective gradient would have a dissipation capacity of approximately 150 mW.

Examples of potential uses for the above-described insulated container 120 include storage and transportation of live serums, transportation of donor organs, storage and transportation of temperature products, and thermal isolation of temperature sensitive electronics.

Alternate Molecule Guiding Geometry

Figure 9:
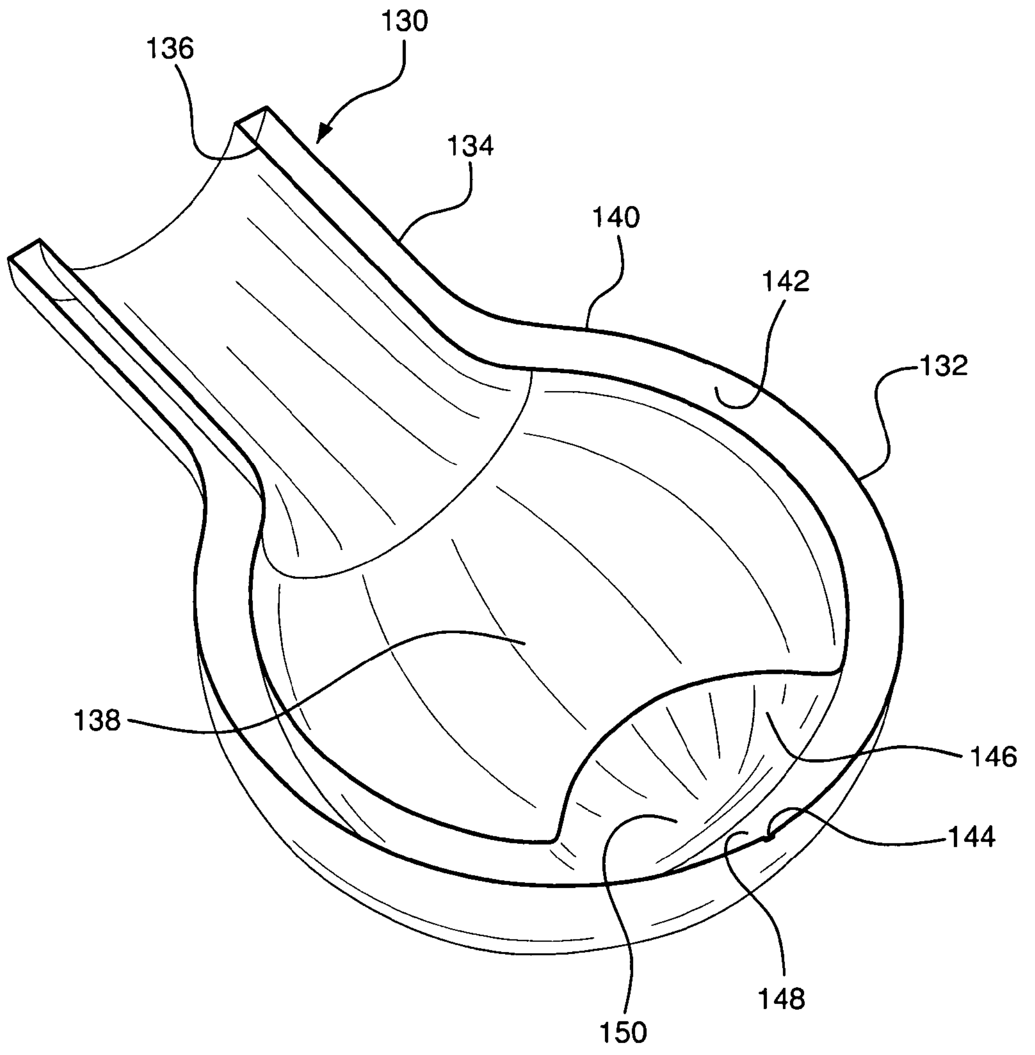
FIG. 9 is a perspective view, in section, of a Dewar according to the invention.

The present invention is not limited to the converging geometry incorporated in the insulated structure shown in FIGS. 1-8. Referring to FIG. 9, there is shown a Dewar 130 incorporating an alternate form of gas molecule guiding geometry according to the invention. The Dewar 130 includes a rounded base 132 connected to a cylindrical neck 134. The Dewar 130 includes an inner wall 136 defining an interior 138 for the Dewar. An outer wall 140 is spaced from the inner wall 136 by a distance to define an insulating space 142 therebetween that extends around the base 132 and the neck 134. A vent 144, located in the outer wall 140 of the base 132, communicates with the insulating space 142 to provide an exit pathway for gas molecules during evacuation of the space 142.

A lower portion 146 of the inner wall 136 opposite vent 144 is indented towards the interior 138, and away from the vent 144. The indented portion 146 forms a corresponding portion 148 of the insulating space 142 in which the distance between the inner and outer walls 136, 140 is variable. The indented portion 146 of inner wall 136 presents a concave curved surface 150 in the insulating space 142 opposite the vent 144. Preferably the indented portion 146 of inner wall 136 is curved such that, at any location of the indented portion a normal line to the concave curved surface 150 will be directed substantially towards the vent 144. In this fashion, the concave curved surface 150 of the inner wall 136 is focused on vent 144. The guiding of the gas molecules towards the vent 144 that is provided by the focused surface 150 is analogous to a reflector returning a focused beam of light from separate light rays directed at the reflector. In conditions of low gas molecule concentration, in which structure becomes a first order system effect, the guiding effect provided by the focused surface 150 serves to direct the gas molecules in a targeted manner toward the vent 144. The targeting of the vent 144 by the focused surface 150 of inner wall 136 in this manner increases the probability that gas molecules will leave the insulating space 142 instead of entering thereby providing deeper vacuum in the insulating space than vacuum applied to an exterior of the Dewar 130.

Other Applications

The present invention has application for providing insulating layers in a wide range of thermal devices ranging from devices operating at cryogenic temperatures to high temperature devices. A non-limiting list of examples includes insulation for heat exchangers, flowing or static cryogenic materials, flowing or static warm materials, temperature-maintained materials, flowing gases, and temperature-controlled processes.

This invention allows direct cooling of specific microcircuit components on a circuit. In the medical field, the present invention has uses in cryogenic or heat-therapy surgery, and insulates healthy tissue from the effects of extreme temperatures. An insulted container, such as container 120, will allow the safe transport over long distances and extended time of temperature critical therapies and organs.

The foregoing describes the invention in terms of embodiments foreseen by the inventors for which an enabling description was available, notwithstanding that insubstantial modifications of the invention, not presently foreseen, may nonetheless represent equivalents thereto.

What is claimed is:

1. A method of insulating an article having first and second walls spaced at a distance from each other to define an insulating space therebetween, the method comprising:

providing a vent in communication with the insulating space;

providing an exit pathway for gas molecules to exit from the insulating space through the vent by varying the distance between the first and second walls in a portion of the insulating space proximate to the vent such that gas molecules are guided towards the vent when a vacuum is applied to the vent;

placing the article in a vacuum chamber to apply a vacuum to the vent, wherein the vacuum applied to the vent is sufficiently low that molecule-to-molecule interactions within the insulating space no longer dominate;

generating a vacuum within the insulating space that is deeper than the vacuum applied to the vent as a result of the exit pathway increasing the probability of gas molecule egress from the insulating space as compared with the probability of gas molecule ingress into the insulating space; and sealing the vent to maintain the deeper vacuum within the insulating space.

2. The method according to claim 1, wherein the exit pathway is defined by converging portions of the first and second walls.

3. The method according to claim 2, wherein the first and second walls are respectively provided by inner and outer tubes and wherein the outer tube includes an angled portion that converges towards the inner tube.

4. The method according to claim 3, further comprising:

providing a layer of spacer material between the inner and outer tubes that limits direct contact between the tubes while permitting flexing of the tubes.

5. The method according to claim 1, wherein the first and second walls are respectively inner and outer walls, the vent is located in the outer wall, and the exit pathway includes a concavely curved surface formed on the inner wall such that a line normal to the concavely curved surface at any location within the exit pathway is directed substantially towards the vent.

6. The method according to claim 1, wherein sealing the vent includes of:

placing a brazing material adjacent the vent; and heating the brazing material such that the brazing material melts and flows by capillary action into an evacuation path defined by the vent to block the evacuation path.

7. A method of insulating an article having first and second walls spaced at a distance from each other to define an insulating space therebetween, the method comprising:

providing a vent in communication with the insulating space;

providing an exit pathway for gas molecules to exit from the insulating space through the vent by varying the distance between the first and second walls in a portion of the insulating space proximate to the vent such that gas molecules are guided towards the vent when a vacuum is applied to the vent;

applying a vacuum to the vent;

generating a vacuum within the insulating space tat is deeper than the vacuum applied to the vent as a result of the exit pathway increasing the probability of gas molecule egress from the insulating space as compared with the probability of gas molecule ingress into the insulating space; and sealing the vent to maintain the deeper vacuum within the insulating space.

* * * * *